United States Patent
Jeffryes et al.

(10) Patent No.: US 6,279,917 B1
(45) Date of Patent: Aug. 28, 2001

(54) HIGH PRESSURE SEAL

(75) Inventors: Andrew Isaac Jeffryes; Robert Kenneth Trowell, both of Thornbury (GB)

(73) Assignee: Trikon Equipments Limited, Newport (GB)

(*) Notice: Subject to any disclaimer, the term of this patent is extended or adjusted under 35 U.S.C. 154(b) by 0 days.

(21) Appl. No.: 09/214,492

(22) PCT Filed: Jul. 18, 1997

(86) PCT No.: PCT/GB97/01963

§ 371 Date: Jul. 30, 1999

§ 102(e) Date: Jul. 30, 1999

(87) PCT Pub. No.: WO98/05888

PCT Pub. Date: Feb. 12, 1998

(30) Foreign Application Priority Data

Aug. 1, 1996 (GB) .................................................. 9616214

(51) Int. Cl.[7] ..................................................... F16J 15/08
(52) U.S. Cl. ............................. 277/650; 277/654; 277/942
(58) Field of Search .................................... 277/650, 939, 277/940, 592, 654, 942

(56) References Cited

U.S. PATENT DOCUMENTS

| | | | |
|---|---|---|---|
| 3,163,431 | * | 12/1964 | Tanner . |
| 4,395,050 | * | 7/1983 | Wirz ..................................... 277/650 |
| 4,810,591 | * | 3/1989 | Sakai .................................... 428/652 |
| 5,360,239 | * | 11/1994 | Klementich ............................ 285/94 |
| 5,669,612 | * | 9/1997 | Nicholson . |
| 6,027,145 | * | 2/2000 | Tsuru et al. ............................ 285/94 |

FOREIGN PATENT DOCUMENTS

| | | |
|---|---|---|
| 0711 938 A1 | 5/1996 | (EP) . |
| 57-167568 | * 10/1982 | (JP) . |
| 9308591 | * 4/1993 | (WO) . |
| WO 93/08591 | 4/1993 | (WO) . |

* cited by examiner

*Primary Examiner*—Anthony Knight
*Assistant Examiner*—Alison K. Pickard
(74) *Attorney, Agent, or Firm*—Jones Volentine, PLLC

(57) ABSTRACT

A seal is formed between two parts of a high pressured chamber by means of a rigid ring (13), which is formed with curved surfaces (17), that engage with an anvil (14) and an enclosure part (10), the anvil (14) having a similar curved projection (18). At least one of the engaging surfaces is coated with a soft metal e.g. silver.

10 Claims, 3 Drawing Sheets

HIGH PRESSURE SEAL

This invention relates to high pressure seals and in particular, but not exclusively, when such seals are being formed between two rigid elements.

There are a number of occasions in which it is necessary to form seals between two engaging metal faces which are being pressed together, but which are subject to significant fluid pressure which is acting in a sense to urge them apart. It is often desirable that these seals are made and remade over a large number of cycles. Previous seals have used a grease such as a silicone based vacuum grease to lubricate the wear surfaces. Such grease is also used when O-rings are provided. In certain instances this grease is undesirable, because cleaning and regressing can be needed on a regular basis causing down time of apparatus.

One example of such a sealing arrangement is described in European Patent Application No. 9292023.4 wherein a high pressure chamber is being used to process semiconductor wafers. A particular requirement of such an arrangements is that the levels of particulate material must be kept to a minimum.

From one aspect the present invention consists in a vacuum or high pressure reusable seal formed between two engaging parts of rigid elements comprising, a coating of a soft metal over at least one of the engaging parts and means for urging the parts together.

The rigid elements may be formed of steel or aluminium. The seal may include an underlayer, which may, far example, be nickel. That underlayer may be approximately 2 $\mu$m thick. The coating may be between 15 $\mu$m and 20 $\mu$m thick.

The coating may be gold, silver, platinum, palladium copper, lead or indium, or a combination of these. However, materials such as gold and copper diffuse quite readily into semiconductor materials such as silicon or gallium arsenide and so if the seal is being used in association with a machine for processing such materials, those metals may not be appropriate.

A particularly preferred coating is silver and this coating is suitable for use with semiconductor materials.

The invention also includes a high pressure chamber formed by two closable portions and a seal as defined above.

Although the invention has been defined above, it is to be understood it includes any inventive combination of the features set out above or in the following description.

The invention may be performed in various ways and specific embodiments will now be described, by way of example, with reference to the accompanying drawings, in which.

Figure 1:
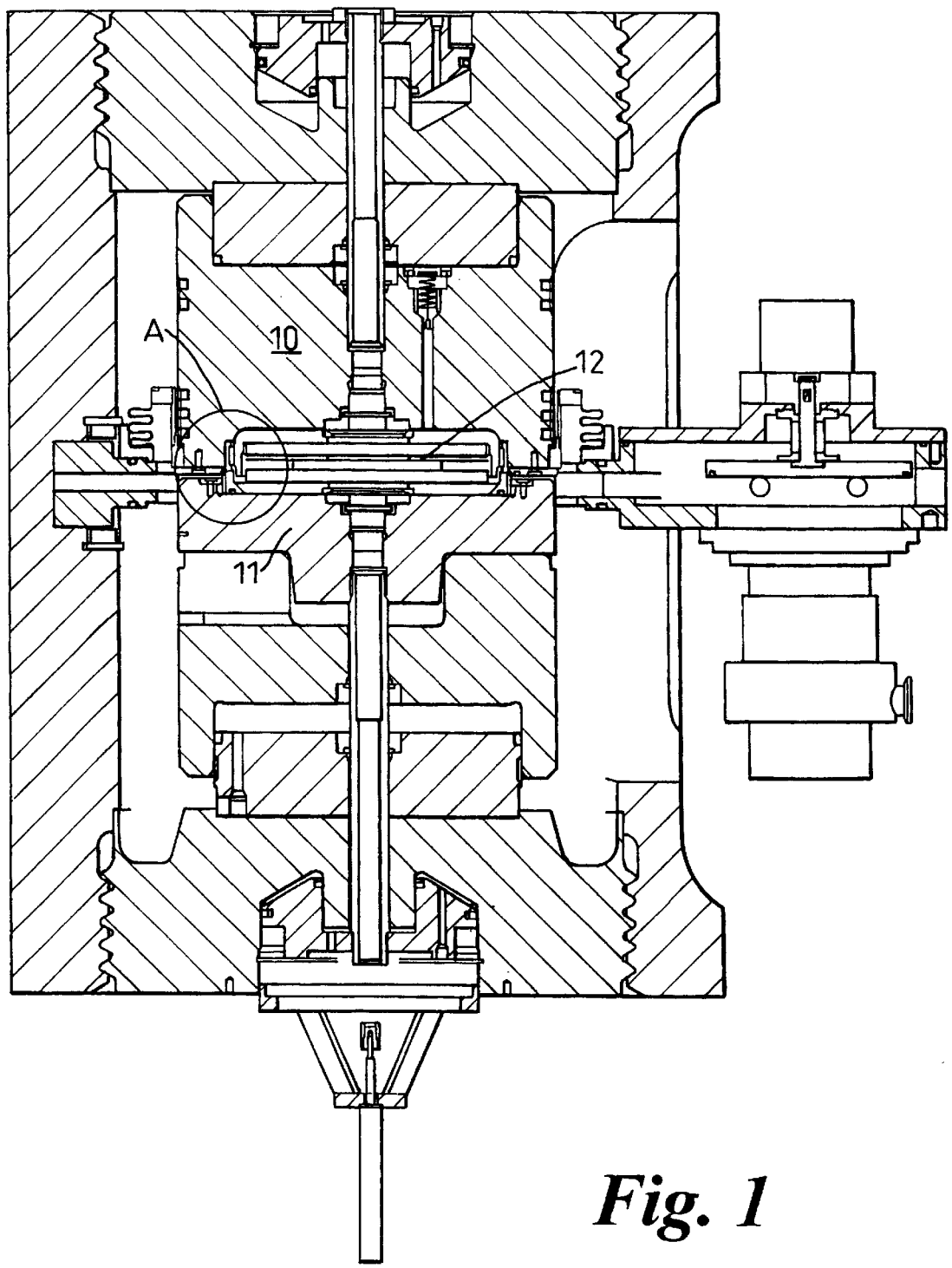
FIG. 1 is a vertical cross-section through a machine of the type described in European Patent Application No. 9292023.4.
Figure 2:
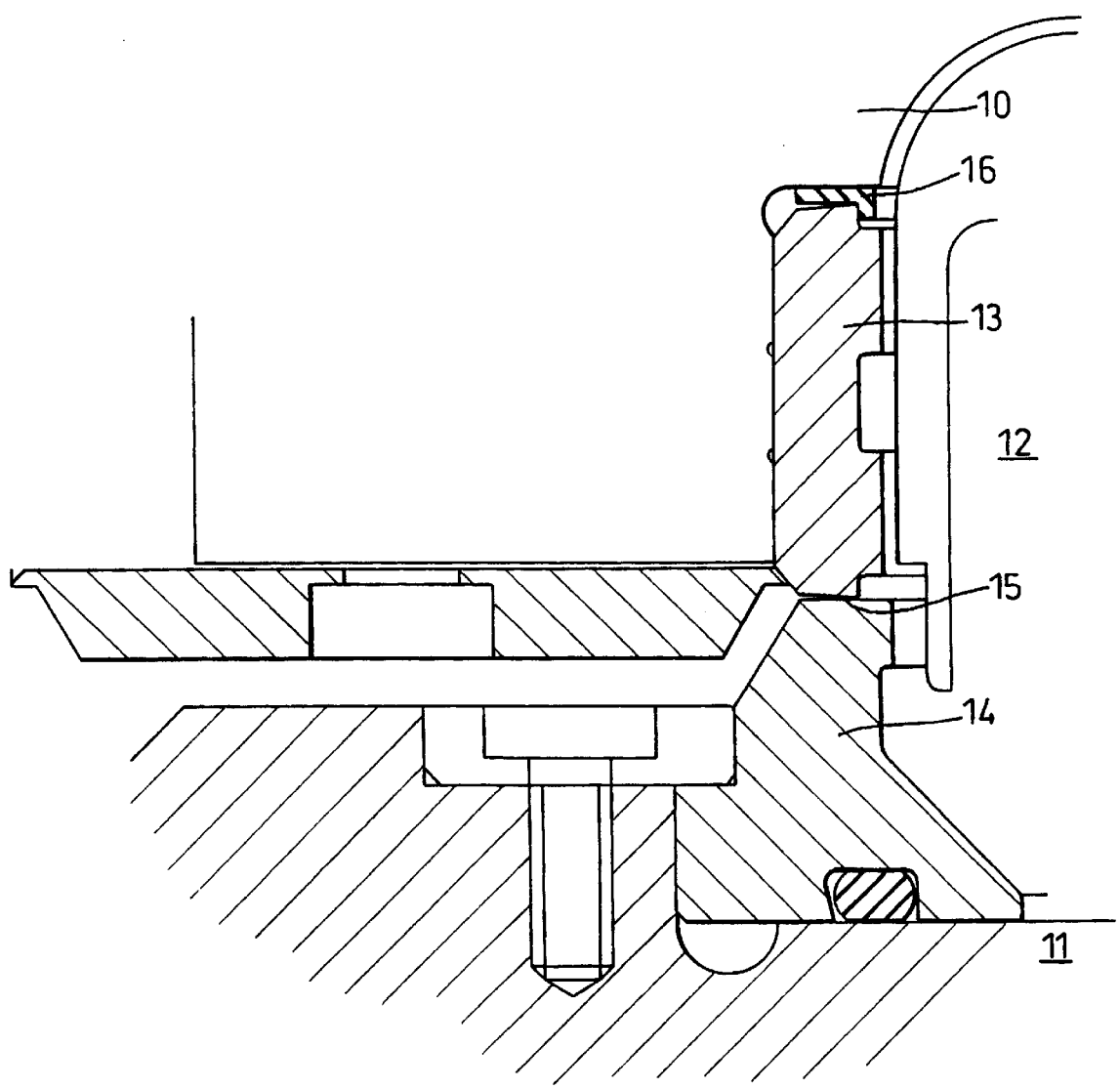
FIG. 2 is a detail at A of the seal of that apparatus.

The apparatus will not be described in detail, but instead the disclosure of European Patent Application No. 9292023.4 is incorporated for that purpose. However, essentially, two enclosure parts 10, and 11, are forced together to form a chamber 12 between them in which semiconductor wafers be processed. As can be seen in FIG. 2 five sealing interfaces occur between the enclosure part 10 and the enclosure part 11. The first seal is formed between a gasket 16 and the upper enclosure part 10. A rigid ring 13 forms seals with the gasket 16 and, at 15, with an anvil 14. The anvil 14 is secured to the lower enclosure part 11 and uses an O-ring to provide a seal between the anvil and the enclosure part 11.

Figure 3:
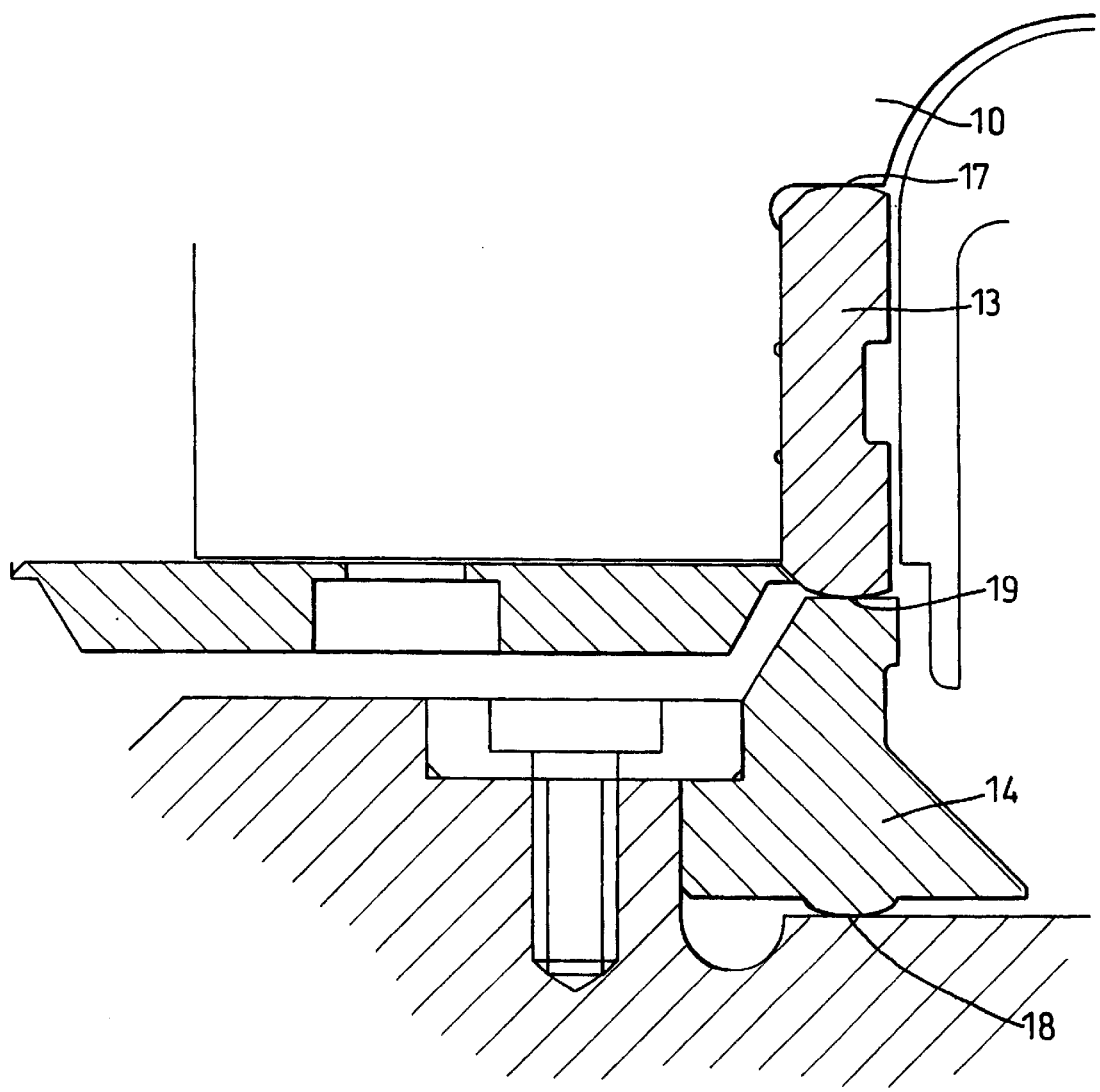
FIG. 3 is a corresponding view of a seal utilising seal of the invention.

Turning to FIG. 3, it will be seen that the rigid ring 13 is now formed with curved surfaces 17 and 19 that engage with the anvil 14 and the enclosure part 10 and the anvil 14 has a similar curved projection 18 in place of the O-ring. It has been found that such engagement shapes are possible if at least one of the engaging surfaces is coated with a soft (e.g. noble) metal, because such metals serve to lubricate the wear surface and remove the need for the use of grease. As has been pointed out already for semiconductor wafer use, silver is particularly preferred and attention must be given to the diffusion rates of the coating metal into the material which is being processed.

If the metal coating is deposited by electroplating, it is desirable to provide a nickel underlayer, but other methods of forming the coating may be used.

To improve the integrity of the coating, it may be desirable to coat the complete ring 13 or anvil 14 and it may, in some instances, be appropriate to coat both engaging surfaces, although current tests show that a single coated surface is extremely effective.

The use of different shapes of engagement surfaces rather than line contacts may have broad applicability.

What is claimed is:

1. A high pressure chamber comprising upper and lower enclosures and a high pressure seal, wherein the high pressure seal is formed between two vertically aligned engaging parts of rigid elements which are secured to the upper and lower enclosures, and wherein the high pressure seal includes a coating of a noble metal over a contact surface of at least one of the engaging parts, and means for urging the vertically aligned engaging parts together in a vertical direction only, wherein the coating is silver, and wherein the first and second enclosures define a semiconductor materials processing chamber.

2. A chamber as claimed in claim 1, wherein the rigid elements are made of steel or aluminium.

3. A chamber as claimed in claim 1, wherein the coating is between 15 and 20 $\mu$m thick.

4. A chamber as claimed in claim 1, wherein at least one of the engaging parts has a curved contact surface.

5. A chamber as claimed in claim 1, wherein a first of the two engaging parts is a rigid ring member sealingly secured to the upper enclosure, and wherein a second of the two engaging parts is an anvil sealingly secured to the lower enclosure.

6. A chamber as claimed in claim 1, wherein the high pressure seal further includes an underlayer beneath the coating of the noble metal.

7. A chamber as claimed in claim 6, wherein the underlayer is nickel.

8. A chamber as claimed in claim 7, wherein the underlayer is approximately 2 $\mu$m thick.

9. A chamber as claimed in claim 6, wherein the underlayer is approximately 2 $\mu$m thick.

10. A chamber as claimed in claim 9, wherein the coating is between 15 and 20 $\mu$m thick.

* * * * *